US009372472B2

(12) United States Patent
Guthrie et al.

(10) Patent No.: US 9,372,472 B2
(45) Date of Patent: Jun. 21, 2016

(54) SYSTEM FOR ORDER ALIGNMENT OF DIFFRACTIVELY PRODUCED IMAGES

(71) Applicant: CHRISTIE DIGITAL SYSTEMS USA, INC., Cypress, CA (US)

(72) Inventors: Simon Guthrie, Kitchener (CA); Michael Perkins, Kitchener (CA); John Domm, Kitchener (CA); John M. Nieminen, Waterloo (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 257 days.

(21) Appl. No.: 13/792,273

(22) Filed: Mar. 11, 2013

(65) Prior Publication Data

US 2014/0253985 A1      Sep. 11, 2014

(51) Int. Cl.
   *G03H 1/22* (2006.01)
(52) U.S. Cl.
   CPC ........... *G03H 1/2205* (2013.01); *G03H 1/2294* (2013.01); *G03H 2001/2218* (2013.01); *G03H 2210/20* (2013.01)
(58) Field of Classification Search
   CPC ........................ G03H 1/2205; G03H 1/2294
   USPC ................... 359/10, 11, 21, 22–26; 365/49.1
   See application file for complete search history.

(56) References Cited

U.S. PATENT DOCUMENTS

| 7,440,158 | B2 | 10/2008 | Giles et al. |
| 8,285,131 | B1 | 10/2012 | Myatt et al. |
| 2008/0247013 | A1* | 10/2008 | Smith et al. ................ 359/9 |
| 2009/0086304 | A1 | 4/2009 | Yurlov et al. |
| 2009/0116088 | A1* | 5/2009 | Okada et al. ............... 359/26 |
| 2010/0103486 | A1 | 4/2010 | Kroll et al. |
| 2011/0149359 | A1 | 6/2011 | Leister |

FOREIGN PATENT DOCUMENTS

| EP | 1090322 B1 | 12/1999 |
| EP | 1550923 A1 | 7/2005 |
| WO | 0135168 A1 | 5/2001 |

OTHER PUBLICATIONS

Corresponding European Patent Application No. EP14158874.9, Extended European Search Report, May 15, 2014.

* cited by examiner

*Primary Examiner* — Jennifer L. Doak
(74) *Attorney, Agent, or Firm* — Perry + Currier Inc.

(57) ABSTRACT

A system for order alignment of diffractively produced images is provided. The system comprises: a diffractive spatial light modulator (DSLM) configured to provide a computer generated hologram of an image; a substantially coherent light source configured to illuminate the DSLM which responsively produces the image along each of different diffractive order paths; and, at least one set of optical components located along respective diffractive order paths of the DSLM, the at least one set of optical components configured to align at least one respective image diffracted from the DSLM with at least another diffracted image at a common image plane.

15 Claims, 8 Drawing Sheets

SYSTEM FOR ORDER ALIGNMENT OF DIFFRACTIVELY PRODUCED IMAGES

FIELD

The specification relates generally to diffractive display systems, and specifically to a system for order alignment of diffractively produced images.

BACKGROUND

When using a diffractive spatial light modulator (DSLM) to produce images using diffractive techniques, illumination light is diffracted from the DSLM into orders, and the illumination light is distributed among the orders.

SUMMARY

In this specification, elements may be described as "configured to" perform one or more functions or "configured for" such functions. In general, an element that is configured to perform or configured for performing a function is configured to perform the function, or is enabled to perform the function, or is suitable for performing the function, or is adapted to perform the function, or is operable to perform the function, or is otherwise capable of performing the function.

An aspect of the specification provides a system comprising: a diffractive spatial light modulator (DSLM) configured to provide a computer generated hologram of an image; a substantially coherent light source configured to illuminate the DSLM which responsively produces the image along each of different diffractive order paths; and, at least one set of optical components located along respective diffractive order paths of the DSLM, the at least one set of optical components configured to align at least one respective image diffracted from the DSLM with at least another diffracted image at a common image plane.

The DSLM can comprise a digital micromirror device (DMD), and the system further can comprise: a further set of optical components configured to align off-state diffractive order images from the DMD with on-state diffractive order images of the DMD.

The DSLM can comprise one or more of a phase modulator, a light modulator, a reflective light modulator, a transmissive light modulator, a liquid crystal on silicon (LCOS) device, a liquid crystal display (LCD) device, and a digital micromirror device (DMD).

The at least one set of optical components can comprise one or more of a prism, a lens, a mirror, fold optics and relay optics.

The at least one set of optical components can be further configured to align twin images, diffracted from the DSLM along the respective diffractive order paths, with the at least another diffracted image at the common image plane The system can further comprise at least one light dump configured to absorb light from diffractive order paths where the image is not directed to the common image plane.

The system can further comprise at least one light dump configured to remove a respective diffractive order dot from the respective diffractive order paths.

The at least one set of optical components can comprise at least one respective light dump configured to remove a respective diffractive order dot from the respective diffractive order paths.

The system can further comprise, at the common image plane, one or more of a screen, a spatial light modulator (SLM), and a mount for photolithography samples.

The substantially coherent light source can comprise one or more of a laser, a substantially coherent human-visible light source, a substantially coherent red light source, a substantially coherent green light source, a substantially coherent blue light source, a substantially coherent ultra-violet light source, and a substantially coherent infrared light source.

A pitch of pixels of the DSLM can be compatible with a wavelength of the substantially coherent light source.

The system can further comprise a computing device configured to control the DSLM to provide the computer generated hologram of the image. The computing device can comprise an image generator.

The DSLM can comprise a reflective light modulator and the substantially coherent light source is located on a same side of the reflective light modulator as the at least one set of optical components.

The DSLM can comprise a transmissive light modulator and the substantially coherent light source is located on an opposite side of the transmissive light modulator as the at least one set of optical components.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1A:
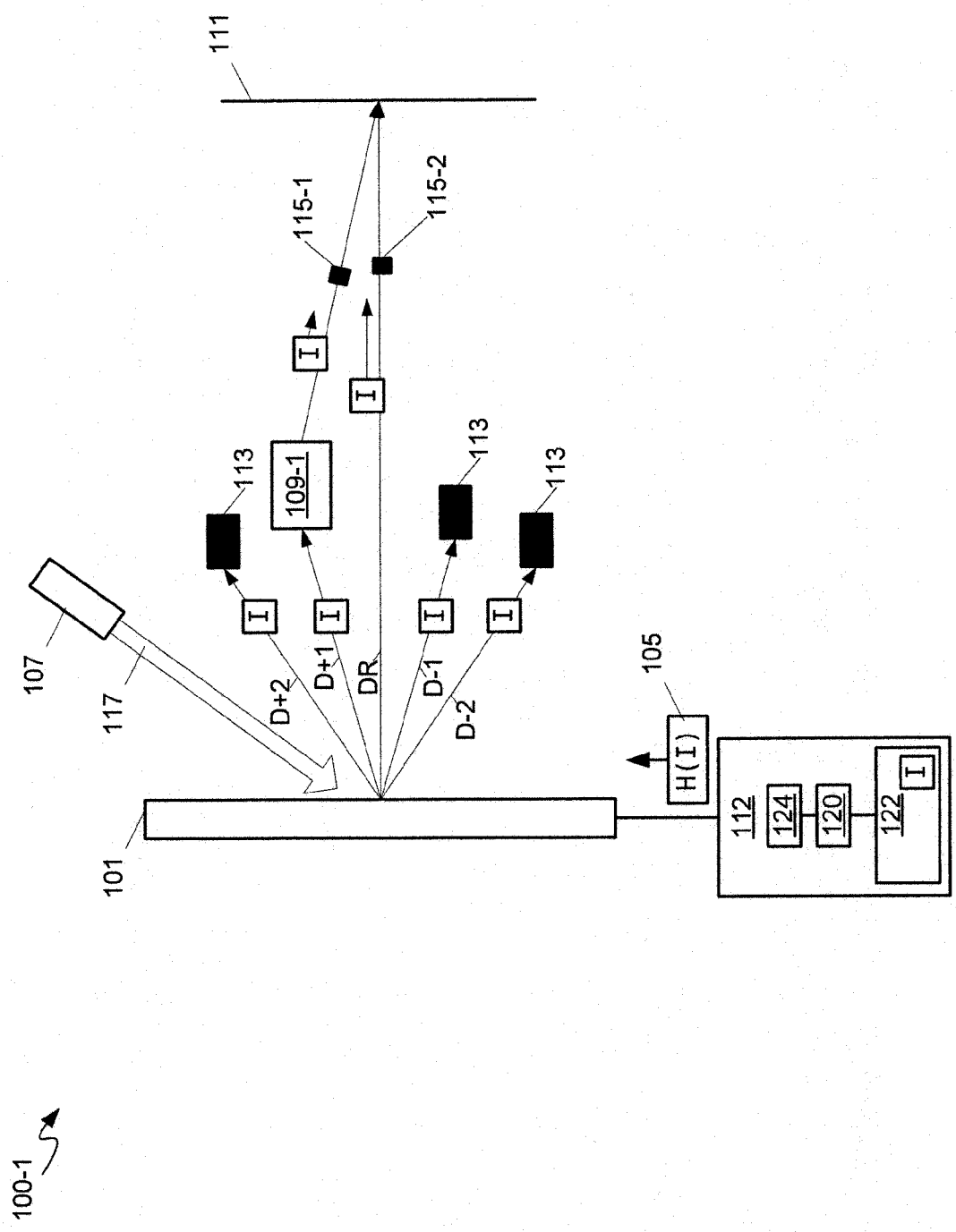
FIG. 1a depicts a system for order alignment of diffractively produced images, according to non-limiting implementations.

FIG. 1a depicts a system 100-1 comprising: a diffractive spatial light modulator (DSLM) 101 configured to provide a computer generated hologram 105 of an image I (shown as "H(I)" in FIG. 1a); a substantially coherent light source 107 configured to illuminate DSLM 101, which responsively produces image I along each of different diffractive order paths DR, D+1, D−1, D+2, D−2, etc.; and, at least one set of optical components 109-1 located along a respective diffractive order paths D+1 of DSLM 101, the at least one set of optical components 109-1 configured to align images I diffracted from DSLM 101 with at least one other diffracted image at a common image plane 111. For example, in FIG. 1*a*, it is appreciated that while diffractive order path DR does not have an optical component thereupon, a respective image I is diffracted to common image plane, and at least one set of optical components 109-1 along diffractive order path D+1 aligns a respective image I with the image I of diffractive order path DR.

As depicted, system 100-1 further comprises a computing device 112 configured to control DSLM 101 to provide the computer generated hologram 105 of the image I, as described below.

In depicted implementations, system 100-1 further comprises at least one light dump 113 configured to absorb light from diffractive order paths D−1, D+2, D−2 where image I is not directed to common image plane 111 by at least one set of optical components 109-1.

In depicted implementations, system 100-1 yet further comprises light dumps 115-1, 115-2, configured to remove a respective diffractive order dot from the respective diffractive order paths D+1, DR, as described below with reference to FIGS. 2*a* and 2*b*. As will be better understood from FIGS. 2*a* and 2*b*, diffractive order dots of each diffractive order path DR, D+1, D−1, D+2, D−2 etc, are centred on a respective diffractive order path, while images I can be off centre; hence light dumps 115-1, 115-2 are depicted as centred on diffractive order paths D+1, DR, while images I are depicted as off-centre.

Order paths DR, D+1, D−1, D+2, D−2 will hereafter be interchangeably referred to, collectively, as paths D, and generically as a path D. Further light dumps 115-1, 115-2 will be collectively referred to hereafter as light dumps 115 and generically as a light dump 115.

Computing device 112 comprises a processor 120 interconnected with a memory 122, and a communication interface 124. In general, memory 122 stores data indicative of image I, and processor 120 is configured to: produce computer generated hologram 105 of image I from the data stored at memory 122; and control DSLM 101 to provide the computer generated hologram 105, for example via communication interface 124, which is in communication with DSLM 101 via any suitable wired or wireless link. In other words, computing device 112 generally comprises an image generator in communication with DSLM 101.

DSLM 101 comprises one or more of a phase modulator, a light modulator, a reflective light modulator, a transmissive light modulator, a liquid crystal on silicon (LCOS) device, a liquid crystal display (LCD) device, and a digital micromirror device (DMD). As depicted in FIG. 1*a*, DSLM 101 comprises a reflective light modulator. Further, DSLM 101 is generally configured to produce diffractive images. In other words, DSLM 101 is generally configured to provide computer generated hologram 105 of image I. It is appreciated that computer generated hologram 105 can be produced using any suitable algorithm, including, but not limited to, inverse Fourier Transforms, Iterative Fourier Transform Algorithms, the Gerchberg-Saxton algorithm and the like. It is further appreciated that the algorithm used can depend on the type of DSLM 101 used; for example, when DSLM 101 comprises a DMD, an inverse Fourier Transform of image I can be used, while when DSLM 101 comprises an LCOS device, the Gerchberg-Saxton algorithm can be used. In any event, it is further appreciated that computing device 112 is configured to control DSLM 101 to produce computer generated hologram 105 such that when substantially coherent light 117 produced by substantially coherent light source 107 interacts with DSLM 101, image I is produced on order paths DR, D+1, D−1, D+2, D−2 etc.

Substantially coherent light source 107 hence comprises one or more of a laser, a substantially coherent human-visible light source, a substantially coherent red light source, a substantially coherent green light source, a substantially coherent blue light source, a substantially coherent ultra-violet light source, and a substantially coherent infrared light source. Substantially coherent light source 107 is generally configured to illuminate at least a portion of DSLM 101 with substantially coherent light 117 such that images I are formed along diffractive light paths D.

Figure 5:
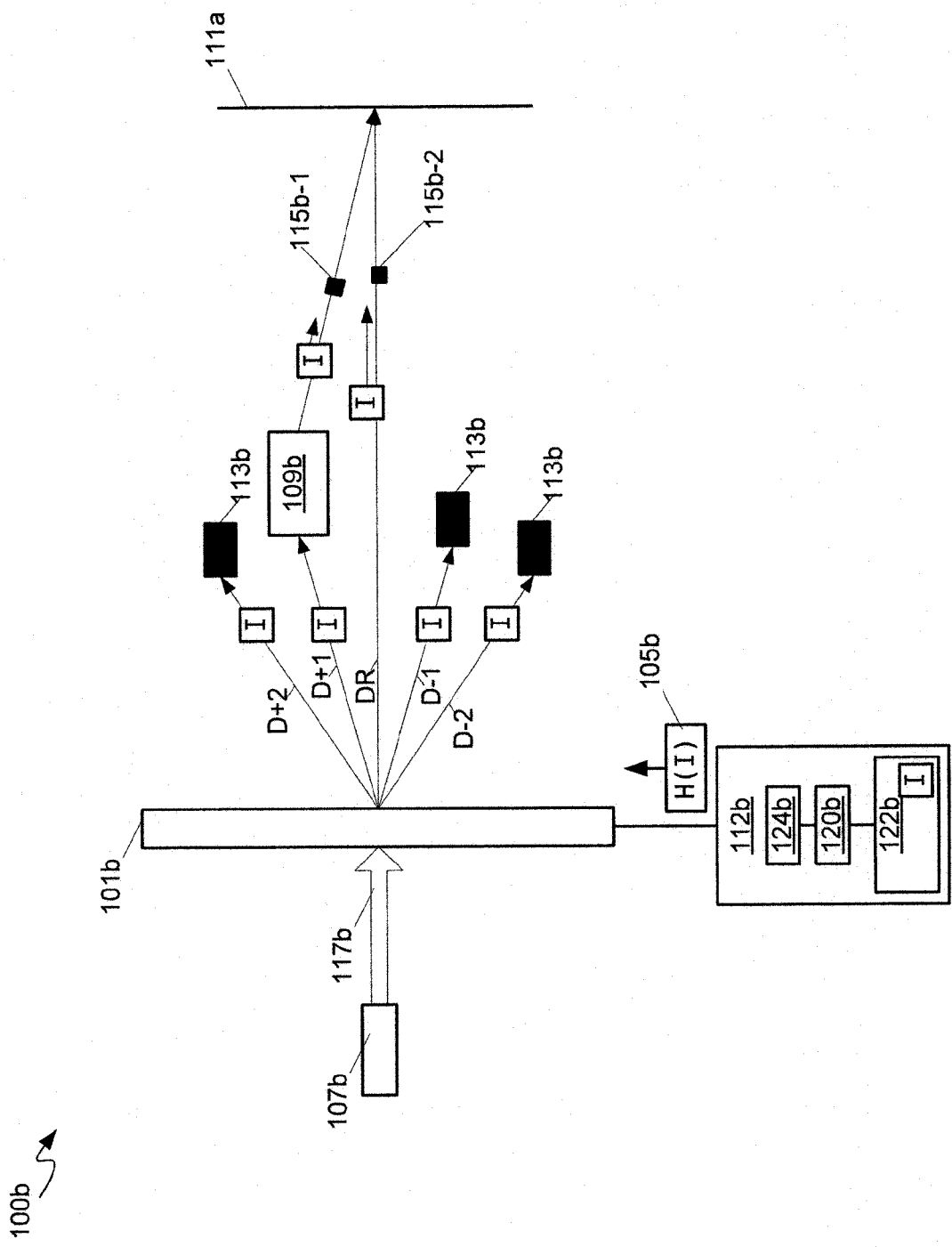
FIG. 5 depicts an alternative system for order alignment of diffractively produced images, according to non-limiting implementations.

It is further appreciated that, as depicted in FIG. 1*a*, DSLM 101 comprises a reflective light modulator, such as a DMD, a reflective LCOS, and the like, and hence substantially coherent light source 107 can be located on a same side of DSLM 101 as at least one set of optical components 109-1. However, when DSLM 101 comprise a transmissive light modulator, such as a transmissive LCOS device, an LCD device, and the like, it is appreciated that substantially coherent light source 107 can be located on an opposite side of DSLM 101 as the at least one set of optical components 109-1 (for example, see FIG. 5).

It is further appreciated that a pitch of pixels of DSLM 101 is compatible with a wavelength of substantially coherent light source 107. For example: when substantially coherent light source 107 produces human-visible light, a pitch of pixels of DSLM 101 is configured to diffract human visible light; when substantially coherent light source 107 produces ultra-violet light, a pitch of pixels of DSLM 101 is configured to diffract ultra-violet light; and when substantially coherent light source 107 produces infrared light, a pitch of pixels of DSLM 101 is configured to diffract infrared light. Hence, in general, substantially coherent light source 107 and DSLM 101 are chosen to be compatible with one another.

It is yet further appreciated that an angle between order paths D is generally dependent on a pitch of pixels of DSLM 101: in general, the smaller the pitch, the larger the angle between order paths, Location of at least one set of optical components 109-1, size of at least one set of optical components 109-1, light dumps 113 and light dumps 115 can be chosen accordingly. Further, the angle can be dependent on a wavelength of substantially coherent light source 107.

It is yet further appreciated that an angle between order paths D and substantially coherent light 117 can depend on the nature of DSLM 101. In a non-limiting example, when DSLM 101 comprises a DMD, the an angle between order paths D and substantially coherent light 117 can depend on the angle of incidence of substantially coherent light 117 and DMD 101, as well as the angle of the on-state (and off-state, for off-state order paths, for example see FIG. 4) of mirrors of DMD 101. In an alternative non-limiting example, when DSLM 101 comprises a reflective LCOS device, the angle between order paths D and substantially coherent light 117 can be centered on a specular reflection of substantially coherent light 117.

It is furthermore appreciated that while only a reference order path DR, first order paths D+1, D−1 and second order path D+2, D−2 are depicted, DSLM 101 generally produces many other order paths, and that light diffracted on each path D generally decreases in intensity as the order increases. In addition, while order paths D are depicted in as being in a plane, order paths D are generally located on a two-dimensional grid (for example, see FIG. 2*a*).

It is yet further appreciated that first order paths D+1, D−1 are order paths that are first order diffraction paths with reference to reference order path DR and that second order path D+2, D−2 are second order diffraction paths with reference to reference order path DR. Indeed, reference order path DR can comprise any given diffractive order path, however, in some implementations, reference order path DR can comprise a diffractive order path that is substantially aligned with, and/or is adjacent to, one or more of a maximum and a local maximum of a sinc function, such that reference order path DR is the brightest of the diffractive order paths. Specifically, intensities of diffractive order paths from DSLM 101 will generally follow a sinc function, and the reference order path hence comprises a diffractive order path that is substantially aligned with, and/or is adjacent to, one or more of a maximum and a local maximum of the sinc function. Further, in some implementations, for example when DSLM 101 meets a blaze condition (i.e. DSLM 101 can comprise a blazed grating), reference order path DR can comprise a diffractive order path that is substantially exactly aligned with one or more of a maximum and a local maximum of a sine function.

Figure 1B:
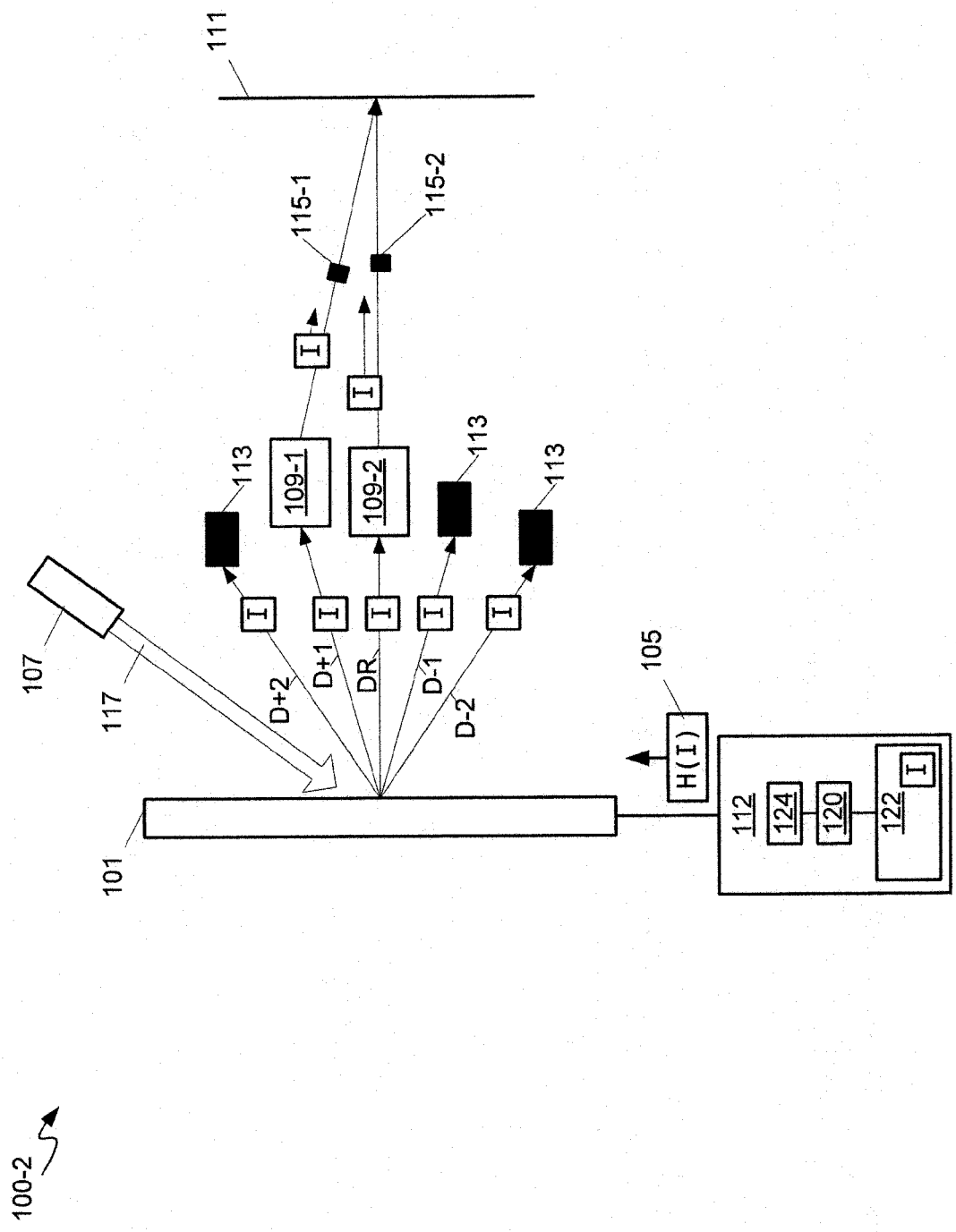
FIG. 1b depicts an alternative system for order alignment of diffractively produced images, according to non-limiting implementations.

Attention is next directed to FIG. 1b, which depicts a system 100-2, substantially similar to system 100-1, with like elements having like numbers. However system 100-2 further comprises a second set of optical components 109-2 located along diffractive order path DR, second set of optical components 109-2 configured to better align a respective image I with the image I of diffractive order path D+1 at common image plane 111. For example, with two sets of optical components 109-1, 109-2 located along respective order paths D+1, DR, respective images I can be aligned at a location on common image plane 111 that is not dictated by the diffractive order path DR. In other words, each set of optical components 109-1, 109-2 can be configured to align a respective image I at a respective location at common image plane 111.

Figure 1C:
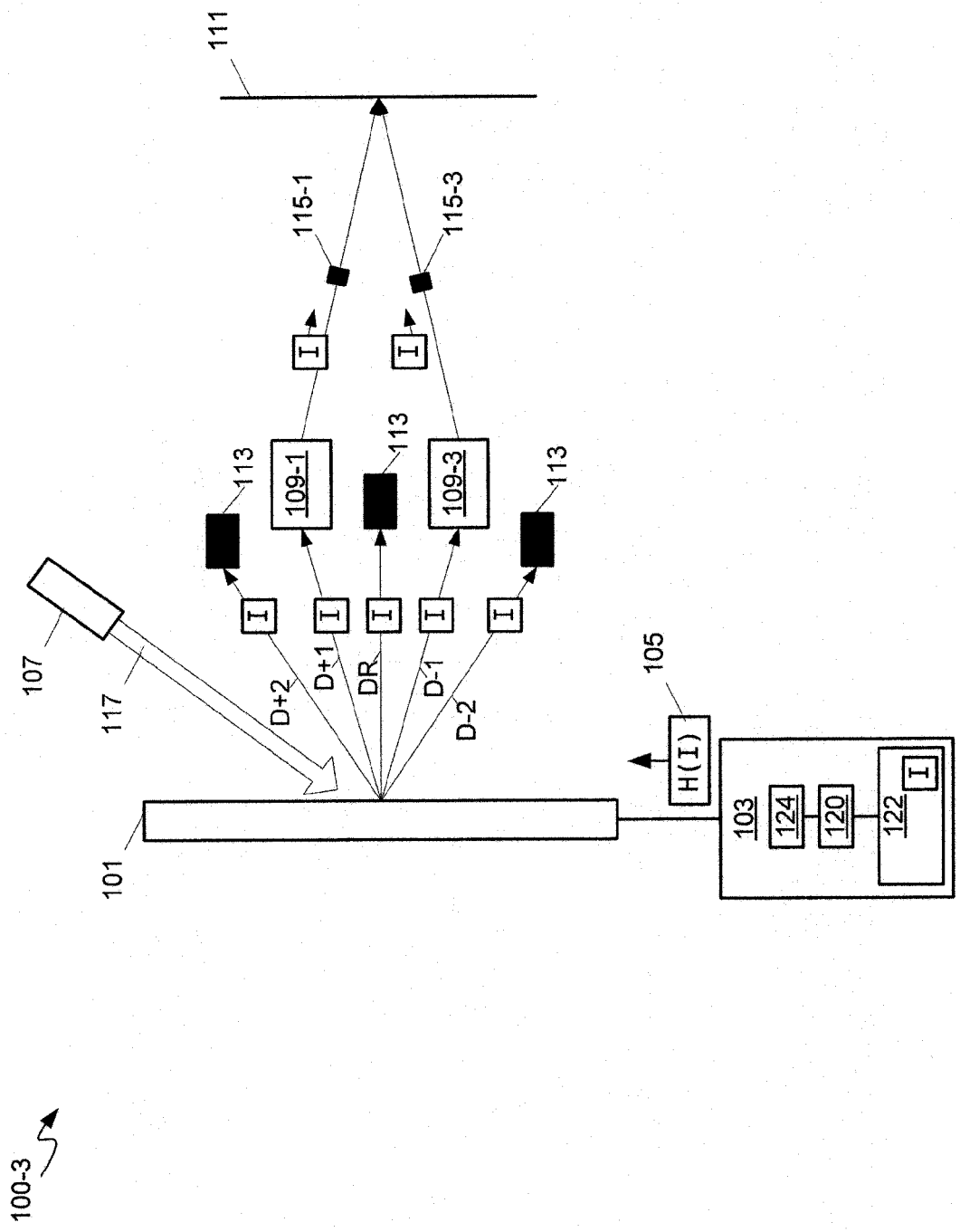
FIG. 1c depicts an alternative system for order alignment of diffractively produced images, according to non-limiting implementations.

Attention is next directed to FIG. 1c, which depicts a system 100-3 substantially similar to system 100-1, with like elements having like numbers. However system 100-3 further comprises another set of optical components 109-3 located along diffractive order path D−1, the another set of optical components 109-3 configured to align a respective image I with the image I of diffractive order path D+1 at common image plane 111. A light dump 115-3, similar to light dumps 115-1, 115-2, is located along diffractive order path D−1 to remove a respective diffractive order dot. Further, an image I of diffractive order path DR is blocked by a light dump 113. However, in other implementations, diffractive order path DR can comprise set of optical components 109-2, as in system 100-1, such that at least three images I are aligned at common image plane 111: images I associated with diffractive order paths DR, D+1, D−1. Furthermore, while in each of systems 100-1, 100-2, 100-3, an image I from diffractive order path D+1 is aligned with at least one other image I at common image plane 111, set of optical components similar to sets of optical components 109-1, 109-2, 109-3 can be located along any of the diffractive order paths DR, D+1, D−1, D+2, D−2, etc.

Hereafter sets of optical components 109-1, 109-2, 109-3 will be interchangeably referred to, collectively, as sets of optical components 109 and generically as a set of optical components 109. Further, systems 100-1, 100-2, 100-3 will be collectively referred to hereafter as systems 100, and generically as a system 100.

Figure 2A:
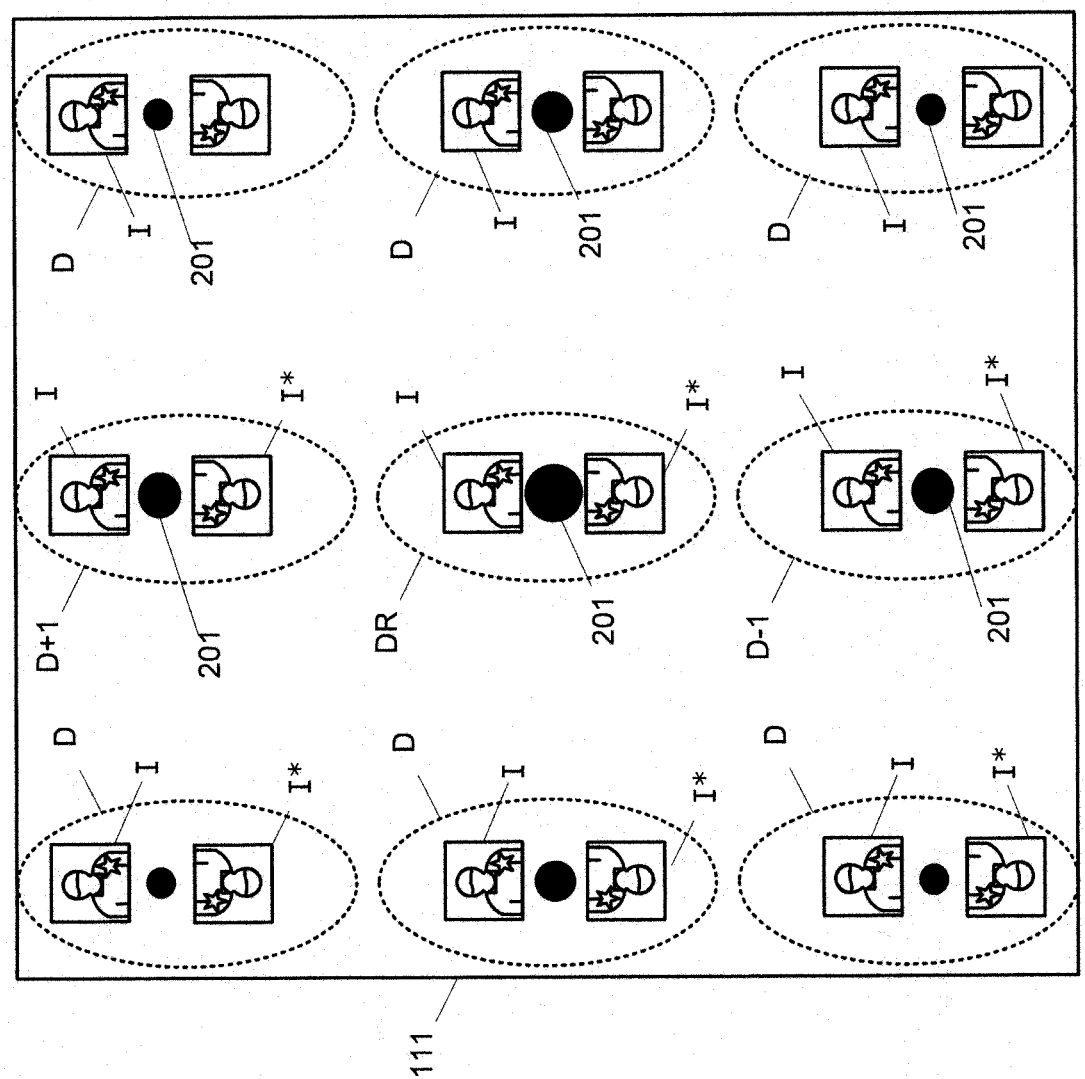
FIG. 2a depicts images and dots at a common image plane of some non-limiting implementations of the systems of FIGS. 1a, 1b, 1c when optical components and light dumps are not present.

Attention is next directed to FIG. 2a, which depicts details a specific non-limiting example of light and/or images I diffracted along order paths D by DSLM 101 at common image plane 111 if optical components 109, light dumps 113 and light dumps 115 were not present in systems 100. Specifically FIG. 2a depicts images I diffracted along order paths D when DSLM 101 comprises, for example, an LCOS device. In FIG. 2a, details of paths DR, D+1, D+1 are depicted, as well as higher order paths, and side order paths, each of which are labelled "D". It is further appreciated that details of order paths D+2, D−2 are not depicted but are located above and below order paths D+1, D−1. Further, while nine order paths D are depicted, it is appreciated that present implementations can include more than nine order paths D.

FIG. 2a illustrates that diffractive order paths are generally arranged in a two dimensional matrix. While the depicted matrix is "square", in other implementations, the matrix can be diamond shaped and the like, and can depend on an angle of incidence of substantially coherent light source 107, a blaze condition of DSLM 101, and the like.

In any event, a dot 201, image I, and twin image I* are diffracted along each order path D. Further dot 201 diffracted along reference order path DR is appreciated to be the brightest dot 201, with the remaining dots 201 decreasing in brightness as the order decreases, presuming that reference order path DR is substantially aligned with, and/or is adjacent to, one or more of a maximum and a local maximum of a sine function. Similarly, image I diffracted along reference order path DR is appreciated to be the brightest image I, with the remaining images I decreasing in brightness as the order decreases (though after a number of orders the brightness of dots I and images I will increase, which is a general property of diffractive systems that follow sine functions).

Further, each order includes a twin image I* similar to image I, but rotated by 180°, which is a general property of diffractive systems. For example, a star on a right hand side of each image I in FIG. 2a is located on left hand side of each twin image I*. As depicted, each twin image I* is located beneath dot 201, (image I located above dot 201); however in other implementations, each twin image I* can be located in another location relative to dot 201. Indeed, when DSLM 101 comprises, for example, an LCOS device, each twin image I* can be located at any position relative to dot 201, the position determined, for example, by locations of image I.

Figure 2B:
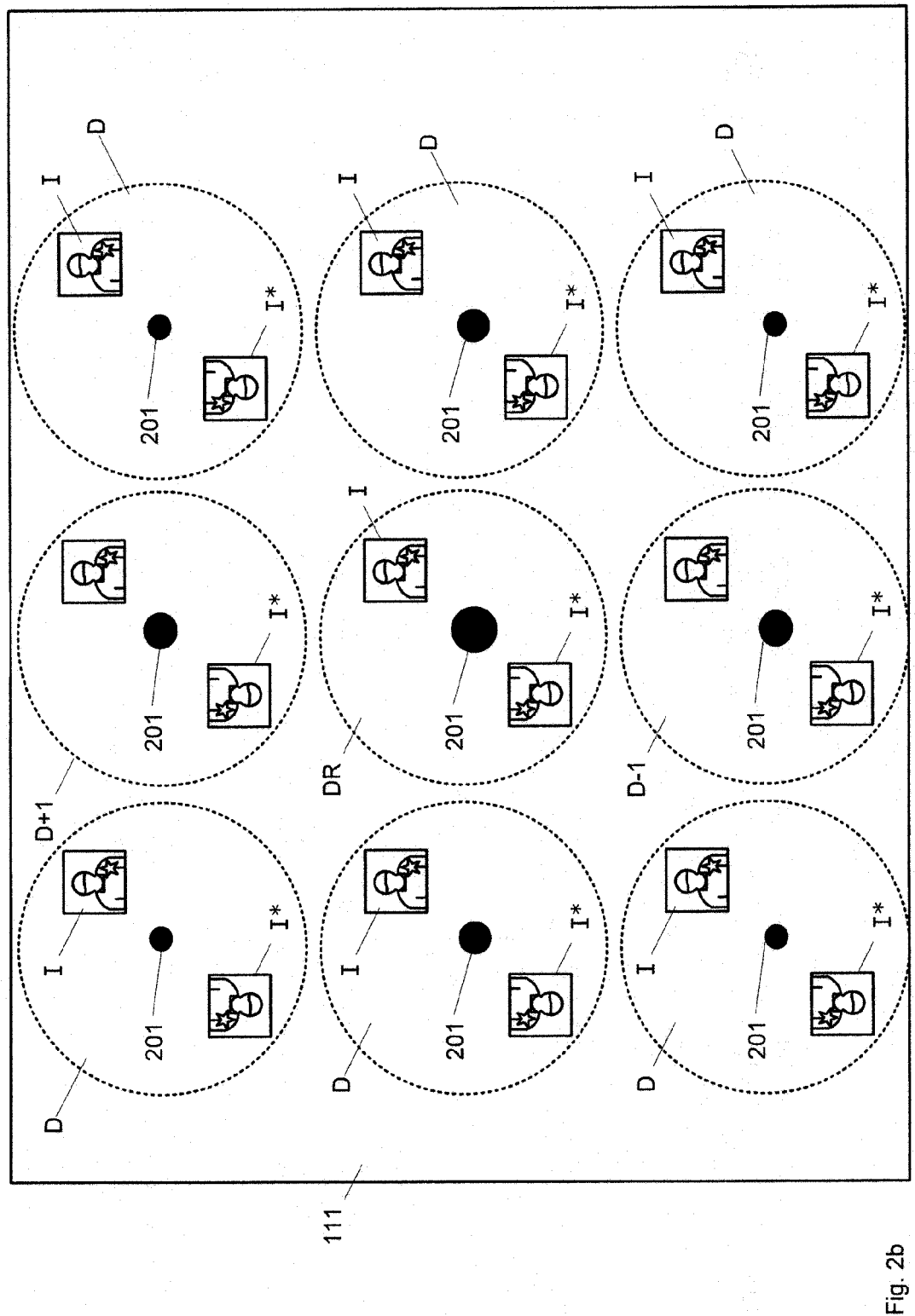
FIG. 2b depicts images and dots at a common image plane of alternative non-limiting implementations of the systems of FIGS. 1a, 1b, 1c when optical components and light dumps are not present.

Attention is next directed to FIG. 2b, which depicts details of another specific non-limiting example of light and/or images I diffracted along order paths D by DSLM 101 at common image plane 111 if optical components 109, light dumps 113 and light dumps 115 were not present in systems 100. Specifically FIG. 2b depicts images I diffracted along order paths D when DSLM 101 comprises, for example, a DMD device. FIG. 2b is substantially similar to FIG. 2a, however in FIG. 2b associated images I, dots 201, and twin images I* are located on a diagonal with each dot 201 between an associated image I and an associated twin image I*.

However, regardless of a location of images I, I*, substantially coherent light 117 is specifically diffracted into images I, I* and dots 201, but images I, I* are generally diffracted in a tiled pattern over an area of image plane 111: when one image I is selected for projection, for example via an aperture and/or light dumps or the like at common image plane 111, light from the other orders (images I, I*) is lost. Further light from the other orders (images I, I*) can scatter and reduce contrast ratio of a selected image I.

To address this issue, and again with reference to FIG. 1a, at least one set of optical components 109 are located along respective diffractive order paths D. The at least one set of optical components 109 can comprise one or more of a prism, a lens, a mirror, fold optics, relay optics, and the like, and any combination thereof, for aligning images I of the respective diffractive order paths D at common image plane 111. While FIG. 1a depicts a set of optical components 109 along order paths D+1, in further implementations, sets of optical components 109 can be located along any of order paths D, as described above with reference to FIGS. 1a, 1b, 1c.

Figure 3:
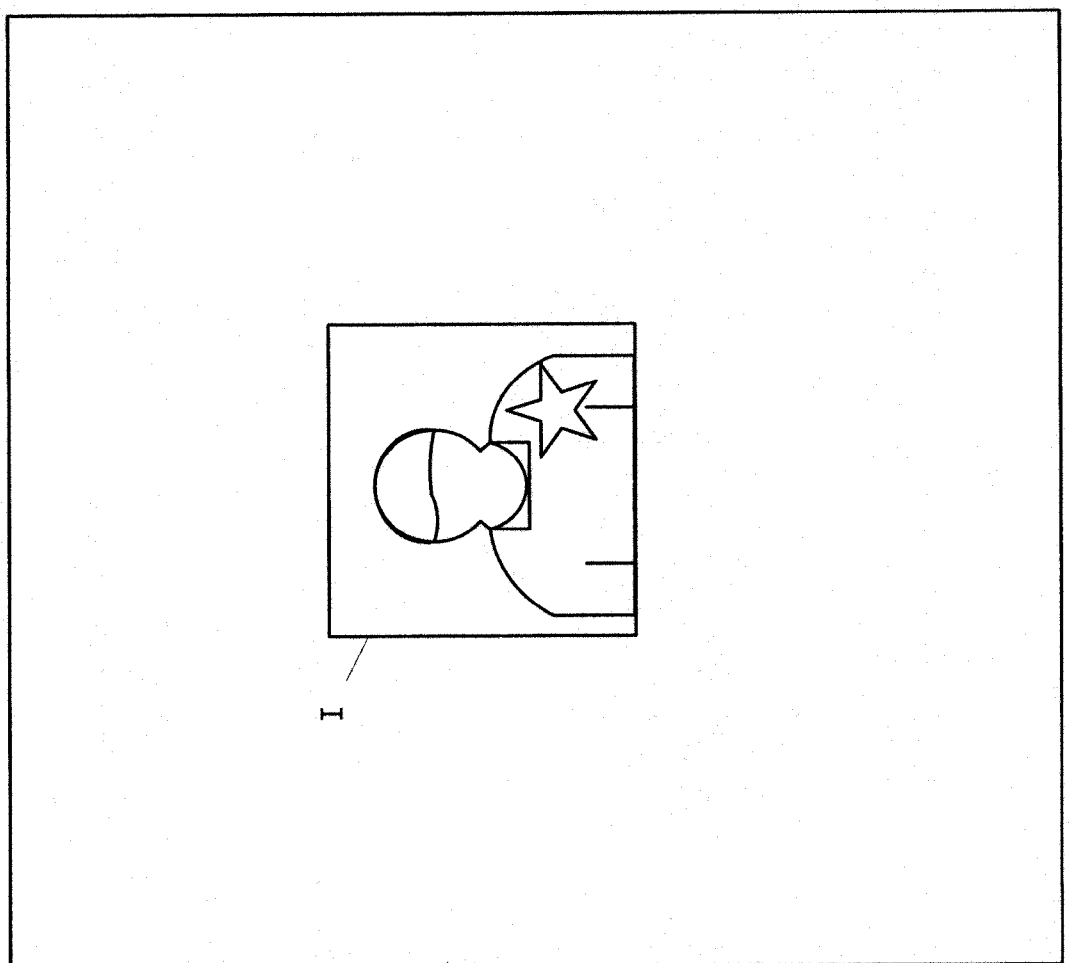
FIG. 3 depicts aligned images at a common image plane of the system of FIG. 1, according to non-limiting implementations.

In any event, images I from at least two of order paths I are aligned at image plane 111 by at least one set optical components 109, thereby combining light from at least two images I into one image I at common image plane 111, as depicted in FIG. 3. Indeed, from FIG. 3 it is appreciated that only one image I is now provided at common image plane 111, however the one image I results from a combination of images I from different diffractive order paths D.

Set of optical components 109 can be further configured to align twin images I*, diffracted from DSLM 101 along respective diffractive order paths D, with images I at common image plane 111, thereby recovering yet more of substantially coherent light 117 of systems 100 into an image I at common image plane 111. Hence, in these implementations, sets of optical components 109 are configured to rotate a twin image I* by 180° and align the rotated twin image I* with an image I.

Dots 201 can be removed via light dumps 115, which act as light dumps for dots 201 while allowing images I to pass thereby. While FIG. 1a depicts light dumps 115 as being separate from sets of optical components 109, in other implementations, optical components 109 can comprise light dumps 115 such that optical components are configured to both align images I as described above, and absorb dots 201. In yet further implementations one or more sets of optical components 109 can further comprise one or more respective light dumps 113.

It is yet further appreciated that, in system 100-1, a twin image I* will be diffracted onto common image plane 111 along diffractive order path DR unless light dump 115-2 is further configured to absorb the twin image I* of diffractive order path DR in addition to an associated dot 201.

Light dumps 113 are provided in order to absorb images I, I* (and dots 201) along diffractive paths D where a set of optical components 109 are not located, to reduce the likelihood of light from these paths entering the desired light path, and reducing contrast of systems 100.

It is appreciated that a substantial portion of substantially coherent light 117 is generally diffracted into reference order path DR and first order paths D+1, D−1, presuming reference order path DR is substantially aligned with, and/or is adjacent to, one or more of a maximum and a local maximum of a sine function, hence one set of optical components 109 located along first order path D+1, as depicted in FIG. 1a, generally results in a substantial portion of substantially coherent light 117 being diffracted into aligned images I at common image plane 111.

It is yet further appreciated that, when DSLM 101 comprises, for example a DMD, sets of optical components 109 can be further configured to align images I from one or more of on-state diffractive light paths and off-state diffractive light paths.

Hence, in alternative implementations, further optics can be integrated into any of systems 100 for folding the on-state and off-state light paths together, when DSLM 101 comprises a DMD, or any other light modulator having on-state and off-state diffractive light paths. For example, attention is next directed to FIG. 4, which depicts a system 100a similar to any of systems 100, with like elements having like numbers, but an "a" appended thereto. For example, optical components 109a are similar to optical components 109. Hence, system 100a comprises: a diffractive spatial light modulator (DSLM) 101a configured to provide a computer generated hologram 105a of an image I; a substantially coherent light source 107a configured to illuminate DSLM 101a, which responsively produces image I along each of different diffractive order paths; and, at least one sets of optical components 109a located along respective diffractive order paths DSLM 101a, the at least one sets of optical components 109a configured to align images I diffracted from DSLM 101a along the respective diffractive order paths at a common image plane 111a. As depicted, system 100a further comprises a computing device 112a configured to control DSLM 101a to provide the computer generated hologram 105a of the image I, as described below. Computing device 112a in turn comprises a processor 120a interconnected with a memory 122a and a communication interface 124a, similar to computing device 112.

Further, in these implementations, DSLM 101a comprises a digital micromirror device (DMD), and the like, and hence diffracts light into on-state order paths D-ON and off-state order paths D-OFF. While details of each of on-state order paths D-ON and off-state order paths D-OFF are not depicted, it is appreciated that each of on-state order paths D-ON and off-state order paths D-OFF comprise diffractive order paths similar to diffractive order paths DR, D+1, D−1, D+2, D−2, etc., described above with reference to FIG. 1a. The individual diffractive order paths D of each of on-state order paths D-ON and off-state order paths D-OFF are not depicted for clarity only.

Further, it is appreciated that optical components 109a, depicted along on-state order paths D-ON, comprises at least one set of optical components, similar to optical components 109 of FIG. 1a. In addition, while light dumps, respectively similar to light dumps 113, 115, are not depicted, they are appreciated to be nonetheless present and/or integrated with optical components 109a. Similarly, optical components 109a, depicted along off-state order paths D-OFF, comprises at least one set of optical components, similar to a set of optical components 109 of any of systems 100. In addition, while light dumps, respectively similar to light dumps 113, 115, are not depicted, they are appreciated to be nonetheless present and/or integrated with optical components 109a. In other words, respective sets of optical components 109a for each of order paths D-ON, D-OFF separately fold together respective on-state images I and off-state images I'.

Further, while on-state order paths D-ON and off-state order paths D-OFF are similar, they are diffracted along different angles. For example, in specific non-limiting implementations, substantially coherent light 117a forms a first given angle with DSLM 101a, and a reference diffractive order path of on-state order paths D-ON can be at a second given angle to substantially coherent light 117a; further a reference diffractive order path of off-state order paths D-OFF can be a third given angle to substantially coherent light 117a. The relationship between the various angles can be dependent on the first given angle of substantially coherent light 117a etc.

It is appreciated that substantially coherent light 117a can be diffracted in given proportions along on-state order paths D-ON and off-state order paths D-OFF, and that the proportions can depend on a number of pixels in the DMD in an on-state, and a number of pixels in an off state. Regardless, images I are diffracted along on-state order paths D-ON, similar to FIGS. 1 and 2, while images I', similar to images I, are diffracted along off-state order paths D-OFF, similar to FIG. 2a, but at an angle to on-state order paths D-ON.

Hence, to recover light from off-state order paths D-OFF, system 100-1 comprises at least one further set of optical components 209 configured to align off-state diffractive order images I' combined by optical components 109a along order paths D-OFF with on-state diffractive order images I combined by optical components 109a along order paths D-ON. Specifically optical components 209 comprise fold optics for folding an off-state image I' (from optical components 109a along order paths D-OFF) with an on-state image I (from optical components 109a along order paths D-ON): optical components 209 directs off-state image I' to image plane 111a to align with on-state image I. In alternative implementations, optical components 209 could be located along a path of on-state images I to align on-state images I with off-state images I'.

Figure 4:
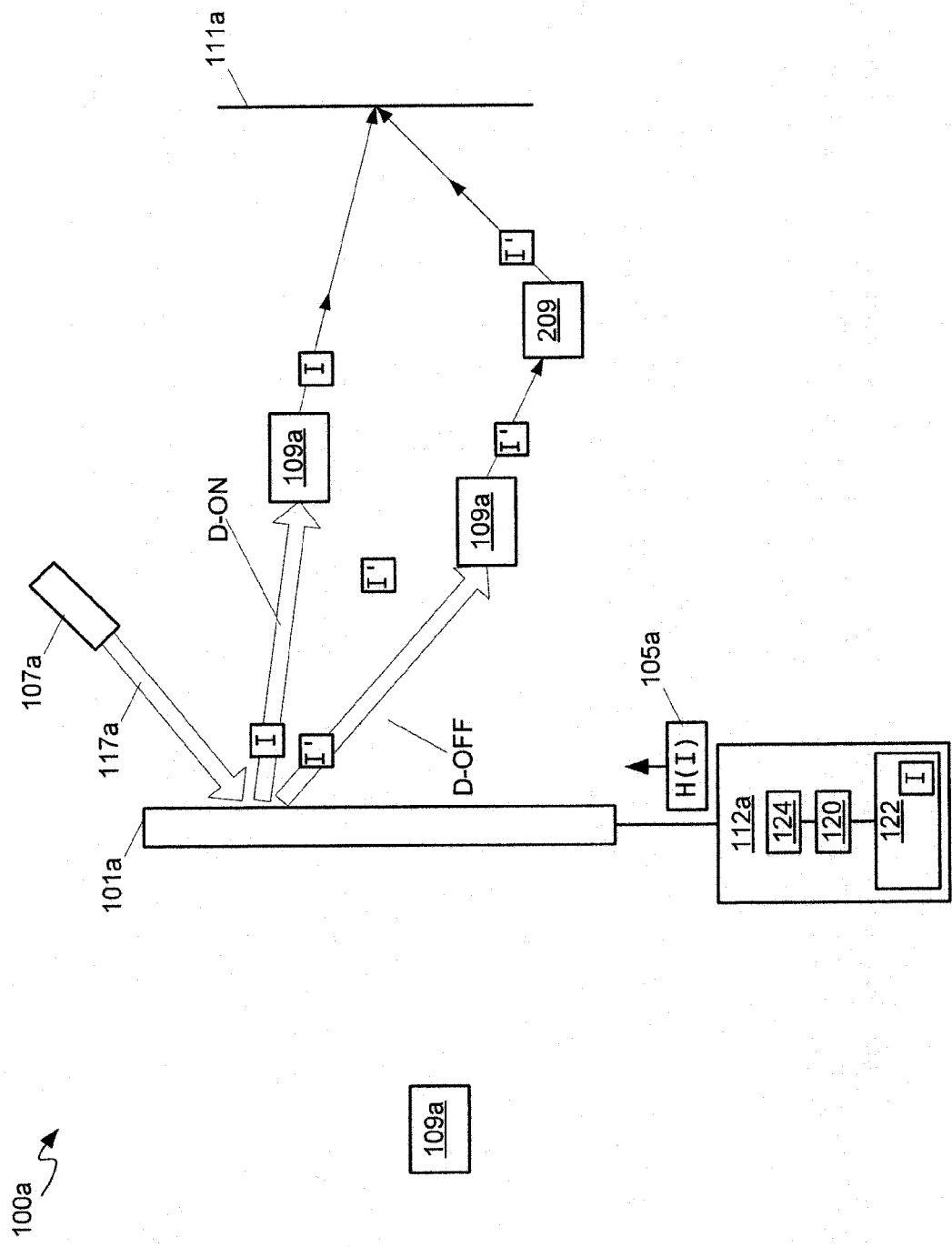
FIG. 4 depicts a system for order alignment of diffractively produced images, according to non-limiting implementations.

While one set of optical components 209 is depicted in FIG. 4, system 100a can comprise any suitable number of optical components configured to align off-state diffractive order images I' with on-state diffractive order images I at image plane 111a.

Furthermore, optical components 209 can be incorporated into one or more of optical components 109a.

While examples heretofore have been directed to reflective DSLMs 101, 101a, in other implementations transmissive DSLM's can be used, including, but not limited to, an LCD device, an LCOS device and the like. For example, attention is next directed to FIG. 5, which depicts a system 100b similar to system 100-1, with like elements having like numbers, but a "b" appended thereto. For example, set of optical components 109b is similar to set of optical components 109 (for example set of optical components 109-1). Hence, system 100b comprises: a diffractive spatial light modulator (DSLM) 101b configured to provide a computer generated hologram 105b of an image I; a substantially coherent light source 107b configured to illuminate DSLM 101b, which responsively produces image I along each of different diffractive order paths; and, at least one set of optical components 109b located along respective diffractive order paths of DSLM 101b, the at least one set of optical components 109b configured to align at least one respective image I diffracted from DSLM 101a with at least another diffracted image at a common image plane 111b. As depicted, system 100b further comprises a computing device 112b configured to control DSLM 101b to provide the computer generated hologram 105a of the image I, as described below. Computing device 112b in turn comprises a processor 120a interconnected with a memory 122b and a communication interface 124b, similar to computing device 112.

However, in system 100b, substantially coherent light source 107b is located on an opposite side of DSLM 101b as the at least one set optical components 109b, as DSLM 101b comprises a transmissive light modulator including, but not limited to, an LCD device, an LCOS device and the like.

It is further appreciated that system 100b can comprise further sets of optical components 109 located along any of diffractive paths D (with corresponding light dumps 113b removed, if present), similar to any of systems 100.

Various uses for systems 100 (and/or systems 100a, 100b) are contemplated. For example, as DSLM 101 diffracts light into images I, I* and dots 201, and as sets of optical components 109 align diffracted images I at common image plane I, the contrast ratio of image I at common image plane 111 is generally suitable for cinema projection systems front projection systems, rear projection systems, simulator systems, photolithography applications, and/or any other light projection system and/or any other light modulation system and/or any other light production system, especially where high contrast ratios of images are desired. Hence, any of systems 100 (and/or systems 100a, 100b) can further comprise, at common image plane 111, a screen, a spatial light modulator (e.g. for further refining images I) and a mount for photolithography samples.

It is further appreciated that implementations of systems 100 (and/or systems 100a, 100b) that include cinema applications and/or simulator applications and/or any other light projection application can include a plurality of substantially coherent light sources, including, but not limited to: a substantially coherent light source, a substantially coherent blue light source, a substantially coherent green light source, and a substantially coherent red light source. It is further appreciated that, other colour combinations of light sources are within the scope of present applications.

In some of these cinema applications, a DSLM 101 is included for each substantially coherent light source, with suitable optical components provided for combining and aligning images of different colours at common image plane 111 to produce a full colour image at a screen at common image plane 111.

Alternatively, one DSLM 101 can be provided, as in systems 100, and substantially coherent light source 107 can alternate between, for example, red, green and blue light in a sequence, with DSLM 101 coordinated to provide computer generated holograms of respective red, green and blue image frames of an image in coordination with red, green and blue illumination of DSLM 101 by substantially coherent light source 107.

In some implementations of systems 100 (and/or systems 100a, 100b) that include simulator applications, substantially coherent light source 107 can be configured to provide one or more of ultra-violet light and infra-red light such that ultra-violet and/or infra-red images aligned with human visible images such that a user of systems 100 (and/or systems 100a, 100b) can alternate between viewing human visible images and ultra-violet and/or infra-red images, for example by using ultra-violet and/or infra-red image viewing apparatus. Alternatively, four or more DSLMs can be provided, one for each of red, green, and blue images and one for ultra-violet images and/or one for infrared images, each DSLM having a respective substantially coherent light source and respective sets of optical components for aligning images at a common image plane.

In any event, by providing suitable optical components to combine images of different diffractive orders, brightness, efficiency and contrast ratio of a diffractive imaging system is generally improved.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system comprising:
a diffractive spatial light modulator (DSLM) configured to provide a computer generated hologram of an image;
a substantially coherent light source configured to illuminate the DSLM which responsively produces repetitions of the image along each of different diffractive order paths arranged in a two dimensional matrix, the repetitions each comprising the image such that a same image is produced along each of the different diffractive order paths; and,
at least two sets of optical components located along respective diffractive order paths of the DSLM in the two dimensional matrix, the at least two sets of optical components configured to align at least one respective repetition of the image diffracted from the DSLM with at least another diffracted repetition of the image to provide one image at a common image plane that results from a combination of at least two respective repetitions of the image from said respective diffractive order paths aligned at the common image plane to recover otherwise lost light.

2. The system of claim 1, wherein the DSLM comprises a digital micromirror device (DMD), and the system further comprises: a further set of optical components configured to align off-state diffractive order images from the DMD with on-state diffractive order images of the DMD.

3. The system of claim 1, wherein the DSLM comprises one or more of a phase modulator, a light modulator, a reflective light modulator, a transmissive light modulator, a liquid crystal on silicon (LCOS) device, a liquid crystal display (LCD) device, and a digital micromirror device (DMD).

4. The system of claim 1, wherein the at least two sets of optical components comprise one or more of a prism, a lens, a mirror, fold optics and relay optics.

5. The system of claim 1, wherein the at least two sets of optical components are further configured to align twin images, diffracted from the DSLM along the respective diffractive order paths, with the at least another diffracted repetition of the image at the common image plane.

6. The system of claim 1, further comprising at least one light dump configured to absorb light from diffractive order paths where respective repetitions of the image are not directed to the common image plane.

7. The system of claim 1, further comprising at least one light dump configured to remove a respective diffractive order dot from the respective diffractive order paths.

8. The system of claim 1, wherein the at least two sets of optical components comprise at least one respective light dump configured to remove a respective diffractive order dot from the respective diffractive order paths.

9. The system of claim 1, further comprising, at the common image plane, one or more of a screen, a spatial light modulator (SLM), and a mount for photolithography samples.

10. The system of claim 1, wherein the substantially coherent light source comprises one or more of a laser, a substantially coherent human-visible light source, a substantially coherent red light source, a substantially coherent green light source, a substantially coherent blue light source, a substantially coherent ultra-violet light source, and a substantially coherent infrared light source.

11. The system of claim 1, wherein a pitch of pixels of the DSLM is compatible with a wavelength of the substantially coherent light source.

12. The system of claim 1, further comprising a computing device configured to control the DSLM to provide the computer generated hologram of the image.

13. The system of claim 12, wherein the computing device comprises an image generator.

14. The system of claim 1, wherein the DSLM comprises a reflective light modulator and the substantially coherent light source is located on a same side of the reflective light modulator as the at least two sets of optical components.

15. The system of claim 1, wherein the DSLM comprises a transmissive light modulator and the substantially coherent light source is located on an opposite side of the transmissive light modulator as the at least two sets of optical components.

* * * * *